(12) United States Patent
Harper

(10) Patent No.: US 8,035,926 B2
(45) Date of Patent: Oct. 11, 2011

(54) SYSTEM INCLUDING A PIVOT ASSEMBLY FOR ADJUSTING MISALIGNMENT AND SKEW BETWEEN A READ/WRITE HEAD AND A FLEXIBLE DATA STORAGE MEDIA

(75) Inventor: David Howard Flores Harper, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 11/933,966

(22) Filed: Nov. 1, 2007

(65) Prior Publication Data
US 2009/0116140 A1    May 7, 2009

(51) Int. Cl.
*G11B 5/55* (2006.01)
(52) U.S. Cl. .................................... 360/261.1; 360/291
(58) Field of Classification Search .... 360/261.1–261.3, 360/291–291.3
See application file for complete search history.

(56) References Cited

U.S. PATENT DOCUMENTS

| | | | |
|---|---|---|---|
| 4,258,398 A * | 3/1981 | Bixby et al. | 360/76 |
| 5,508,865 A * | 4/1996 | La Garcia et al. | 360/291 |
| 5,680,278 A | 10/1997 | Sawtelle, Jr. | |
| 5,694,274 A | 12/1997 | Standiford et al. | |
| 5,883,760 A * | 3/1999 | Yamada et al. | 360/76 |
| 5,949,619 A * | 9/1999 | Eckberg et al. | 360/291 |
| 6,088,184 A | 7/2000 | Hu | |
| 6,195,238 B1 | 2/2001 | Yeakley et al. | |
| 6,307,718 B1 | 10/2001 | Kasetty | |
| 7,095,582 B2 | 8/2006 | Kiahara | |
| 2006/0103968 A1 | 5/2006 | Jurneke | |

FOREIGN PATENT DOCUMENTS

| | | |
|---|---|---|
| EP | 0477030 A1 | 3/1992 |
| JP | 60147924 A | 5/1985 |
| WO | 9613833 A1 | 5/1996 |

* cited by examiner

Primary Examiner — Allen J. Heinz

(57) ABSTRACT

A system for adjusting misalignment between a read/write head and a flexible data storage media is provided. The system includes a head carriage assembly, a linear assembly that includes a pivot member pivotably supporting the head carriage assembly, and a magnetic assembly coupled to the head carriage assembly. Current is applied to the magnetic assembly for dynamically positioning the head carriage assembly relative to a direction of media movement across the head carriage assembly. A first current is applied to the magnetic assembly for track following of media moving across the head carriage assembly. A second current is applied to the magnetic assembly for dynamically rotationally positioning the head carriage assembly to compensate for skew of flexible media moving across the head carriage assembly.

10 Claims, 6 Drawing Sheets

SYSTEM INCLUDING A PIVOT ASSEMBLY FOR ADJUSTING MISALIGNMENT AND SKEW BETWEEN A READ/WRITE HEAD AND A FLEXIBLE DATA STORAGE MEDIA

BACKGROUND OF THE INVENTION

1. Field of the Invention

The present invention relates generally to flexible media data storage devices and systems, and more particularly, to a head positioning system for adjusting for misalignment between a read/write head and a flexible data storage media, such as magnetic tape.

2. Background Information

Business, science and entertainment applications depend upon computers to process and record data, often with large volumes of data being stored or transferred to nonvolatile storage media, such as magnetic discs, magnetic tape cartridges, or optical disk cartridges. Digital data-recording on magnetic data storage tape remains a viable solution far storage of large amounts of data.

Increased data storage capacity and data storage and retrieval performance is desired of all commercially viable mass storage devices and media. In the case of linear magnetic data storage tape, a popular trend is toward multi-channel movable head structures with narrowed track widths so that many linear data tracks may be achieved on a recording medium of a predetermined width, such as one-half inch width magnetic tape. To increase the storage density for a given cartridge size the bits of data on the recording medium must be accurately written to smaller areas and on the plurality of parallel linear data tracks.

As more data tracks are recorded on a tape, each track becomes increasingly narrow and thus, more susceptible to errors that may be caused by misalignment of the tape head to the data tracks. One known problem, as a result of the increase in track density, is tape skew with respect to a reference centerline of the tape head.

The magnetic data storage tape is generally allowed to move perpendicular or laterally to a direction of tape motion. The lateral motion of the tape maybe due to tape path tolerances and dimensional variations of the tape path built into the drive. Examples of tolerances that allow for lateral motion of the tape may include cartridge reel height, take-up reel height, guide heights, tape guide flange-to-flange spacing, take-up and supply reel flange-to-flange spacing, and tape width variations among several other tolerances. Further, as tape is generally read and written by the tape head in both directions the skew may vary with the direction of tape travel.

During data writing operations, separate channels allow for simultaneous read and write operations to a particular data track. Simultaneous read and write operations are know as read-while-write, or read-verity-write, where data is read immediately after being written to the tape to confirm the correct storage of data on the tape. Tape skew may limit the ability to read-while-write for a given data track and read/write element dimensions, since the read element may not be aligned with the data track written by the write elements. To compensate for tape skew, the data tracks are written with sufficient width, such that the read head will be on track during the maximum expected tape skew events. However, writing the tracks with sufficient width to compensate for tape skew, limits the possible density of data tracks for a given tape width and correspondingly limits the storage capacity of the tape. Accordingly, tape skew is one factor that limits the track density and data storage capacity of a magnetic data storage tape.

A system for limiting tape skew is disclosed in United States Patent Application Publication; Pub. No.: 2006/0103,968 A1, to Jurneke. Disclosed therein is a system for positioning a transducer head to a storage medium. The system purportedly compensates for skew of a storage medium, such as magnetic data storage tape and includes a transducer head assembly that includes read and write elements, at least one actuator for adjusting the azimuth position of the transducer head, first and second position sensors, and a controller. The first and second sensors sense a reference associated with a position of the tape, where the first and second sensors are positioned on opposite sides of a centerline of the read and write elements of the transducer head along a direction of tape movement. The sensed positions of the reference on opposite sides of the read and write elements may indicate the relative slope or skew of the tape and data tracks thereon to the transducer head.

The controller adjusts the azimuth position of the transducer head in response to sensed positions of the reference by the first and second sensors. Adjustments to the transducer head may be made on the fly during reading and writing operations. Further, the reference associated with the position of the tape may include one or more edges of the tape that may be a magnetically and/or optically detectable feature of the tape. The transducer head may be adjusted by differential actuators, such as piezoelectric actuators, which rotate the transducer head around its center of mass.

The system disclosed by Jurneke also includes a method for detecting the position of a transducer head with respect to a storage medium. The method includes sensing a reference associated with a position of a storage medium at a first position along a direction of storage medium transport, sensing the reference associated with the position of the storage medium at a second position along the direction of storage medium transport, wherein the first position and the second position are on opposite sides of a transducer head along a direction of storage medium transport, and positioning the azimuth of the transducer head relative to the storage medium in response to the sensed first position and the second position of the reference.

A disadvantage of the disclosed system is that adjusting the position of the transducer head about the center of mass of the head may not offer optimum alignment of the head with the linear data tracks. Ideally, the center of the transducer head should be coincident about a center of mass of the actuator assembly that adjusts the head, including any supporting structure and cabling.

Another known disadvantage of the disclosed system is that means used to adjust the azimuth and other positioning of the transducer head, such as stepper motors and gears, may not be able to dynamically adjust the head quickly enough to maintain proper track following. Further, stepper motor and gear systems are known to fail over time due to wear, for example.

A magnetic tape head tilting mechanism for tilting the magnetic head to a desired azimuth angle system for limiting tape skew is disclosed in U.S. Pat. No. 6,307,718, to Kasetty. Described therein is a magnetic tape head tilting mechanism that uses a worm gear and worm. The worm gear is driven by a stepper motor which adjusts the position of the magnetic head during recording of the signal onto the tape by the write head gap to maintain the strongest signal that is received by the read head gap. Fine angular resolution enables writing very high track densities and providing strong read signals. However, a disadvantage of the disclosed mechanism is that a worm gear and stepper motor system does not provide sufficient bandwidth or reliability needed to support high speed track following. Further, these systems are prone to wear and may fail prematurely.

U.S. Pat. No. 5,680,278, to Sawtelle Jr., describes a mechanism and method for providing rotational and linear movement to an azimuth tape recording head. The disclosed mechanism includes a toothed gear upon which the read/write head is mounted. Two identical threaded shafts, each extending from identical stepper motors are mounted on a base, along a same vertical plane as the toothed gear. Rotational axes of the threaded shads are arranged in a parallel relation such that each is meshably engaged to the toothed gear on opposing sides. Rotational movement of the head is achieved by synchronously rotating the threaded shafts, at the same speed, in opposite directions. Linear movement, or lifting/lowering, of the head is achieved by synchronously rotating one threaded shaft in one direction and the other threaded shaft in the opposite direction. As discussed above, a known disadvantage of worm gear and stepper motor systems is that they do not provide sufficient bandwidth or reliability needed to support high speed track following and that they are prone to wear.

SUMMARY OF THE INVENTION

A system for adjusting misalignment between a read/write head and a flexible data storage media is disclosed. According to one general embodiment the system includes a head carriage assembly, a linear assembly including a pivot member pivotably supporting the head carriage assembly, and a magnetic assembly coupled to the head carriage assembly. Current is applied to the magnetic assembly for dynamically positioning the head carriage assembly relative to a direction of media movement across the head carriage assembly.

A current may be applied to the magnetic assembly for dynamically positioning the head carriage assembly about an axis substantially transverse to the direction of media movement across the head carriage assembly for track following of flexible media moving across the head carriage assembly.

A current may be applied to the magnetic assembly for dynamically rotationally positioning the head carriage assembly about an axis substantially perpendicular to the direction of media movement across the head carriage assembly to compensate for skew of flexible media moving across the head carriage assembly in the direction of media movement.

In one general embodiment of the system the magnetic assembly may comprise a voice coil motor that is coupled to the head carriage assembly for positioning the head carriage assembly about an axis relative to the direction of media movement across the head carriage assembly.

Other aspects and advantages of the present invention will become apparent from the following detailed description, which, when taken in conjunction with, the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

The following description is made for the purpose of illustrating the general principles of the invention and is not mean; to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of tape-based data storage systems, as web as operation and/or component parts thereof. While the following description will be described in terms of a tape data storage system for clarity and to place the invention in context, it should be kept in mind that the teachings herein may have broad application to all types of magnetic data recording and data storage.

The embodiments described below disclose a new system for adjusting misalignment between a read/write head and a flexible data storage media. According to one general embodiment, the system includes a head carriage assembly, a linear assembly including a pivot member pivotably supporting the head carriage assembly, and a magnetic assembly coupled to the head carriage assembly.

Current is applied to the coil assembly for dynamically positioning the head carriage assembly relative to a direction of media movement across the head carriage assembly. A first current is applied to the coil assembly for dynamically positioning the head carriage assembly about an axis substantially transverse to the direction of media movement across the head carriage assembly for track following of flexible media moving across the head carriage assembly.

A second current is applied to the coil assembly for dynamically rotationally positioning the head carriage assembly about an axis substantially perpendicular to the direction of media movement across the head carriage assembly to compensate for skew of magnetic tape moving across the head carriage assembly in the direction of media movement.

In one general embodiment of the system, the magnetic assembly may comprise a voice coil motor that is coupled to the head carriage assembly for positioning the head carriage assembly about an axis relative to the direction of media movement across the head carriage assembly.

Figure 1:
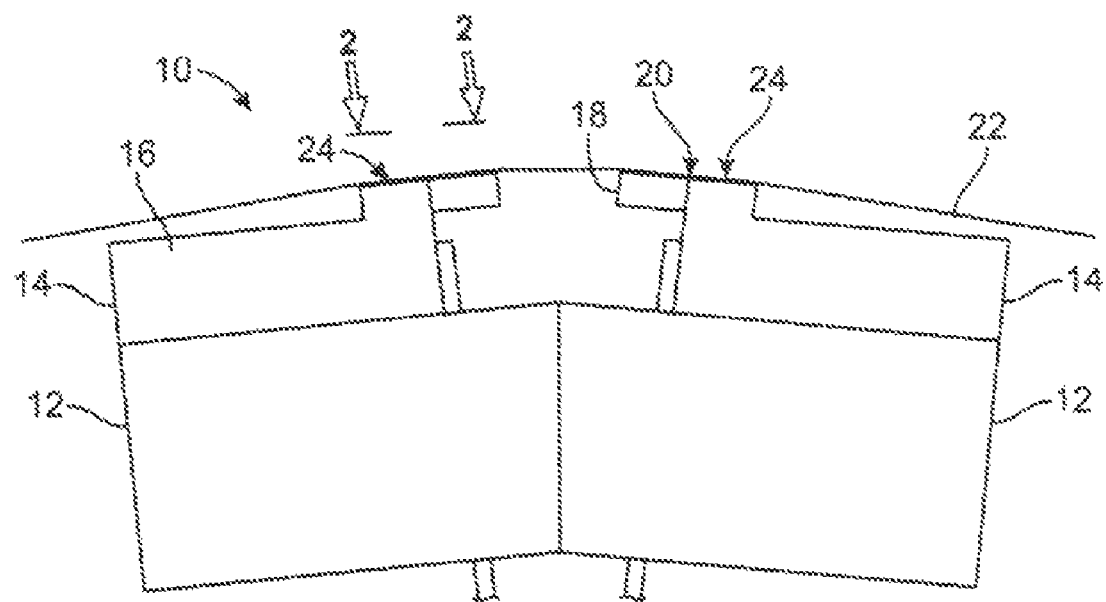
FIG. 1 illustrates a side view of a flat-lapped magnetic tape head.

FIG. 1 illustrates a flat-lapped bi-directional, two-module magnetic tape head 10, found in the art. It is to be understood that the invented system may be used with a known and/or anticipated head design, including one, two, and three module heads. As shown, the head includes a pair of bases 12, each equipped with a module 14. The bases are typically "U-beam-s"that are adhesively coupled together. Each module 14 includes a substrate 16 and a closure 18 with reader and writer elements 20 situated therebetween. In use, a magnetic data storage tape 22, hereinafter "tape" 22, is moved over the modules 14 along a tape bearing surface 24 in the manner shown for reading and writing data on the tape 22 using the readers and writers 20. Conventionally, a partial vacuum is formed between the tape 22 and the tape bearing surface 24 for maintaining the tape 22 in close proximity with the elements 20.

Figure 2:
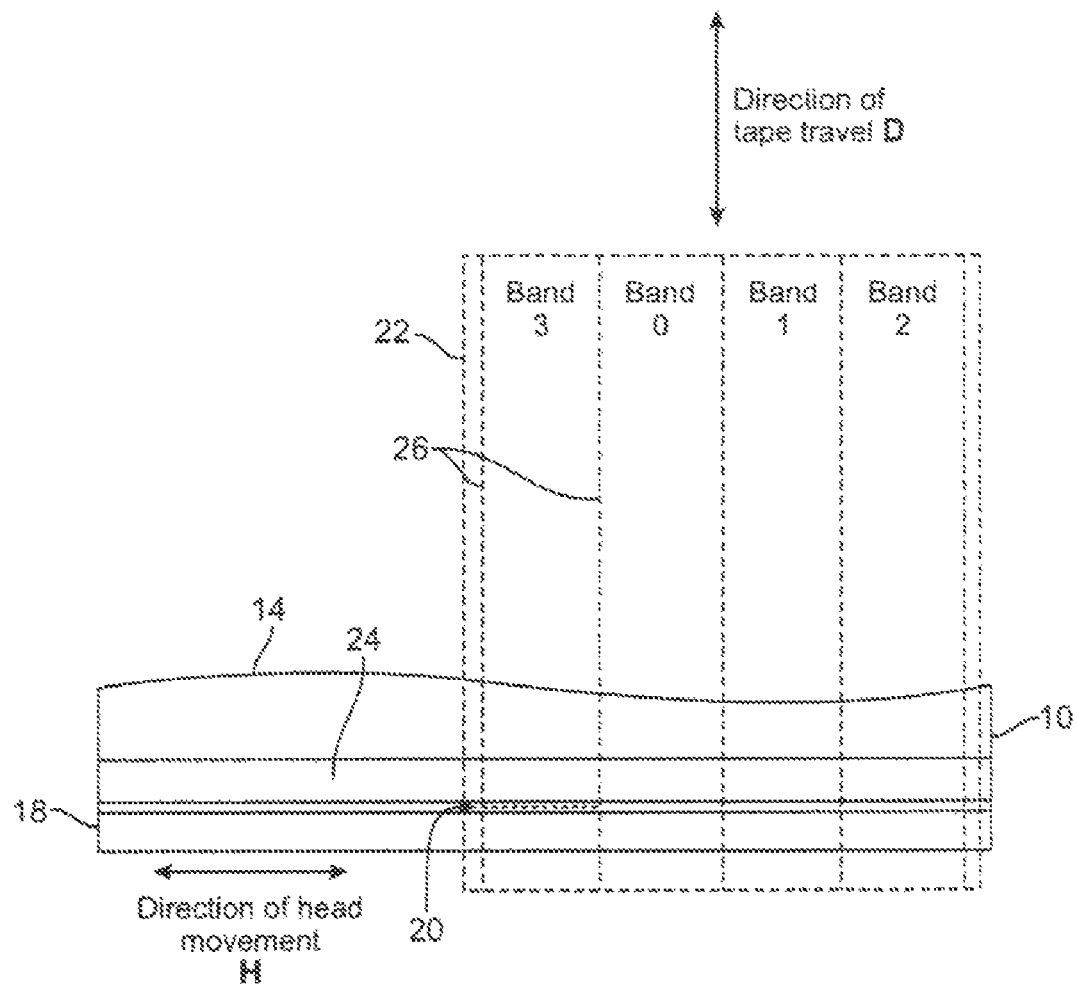
FIG. 2 is a tape bearing surface view taken from Line 2 of FIG. 1.

FIG. 2 illustrates the tape bearing surface 24 of one of the modules 14. The tape 22 is shown in dashed lines. The module 14 is long enough to be able to support the tape 22 as the head 10 steps between data tracks on the tape 22. As shown, the tape 22 includes four data bands (Band 0-3) that are defined between servo tracks 26. Each data band may include a number of data tracks, for example 224 data tracks (not shown).

Figure 3:
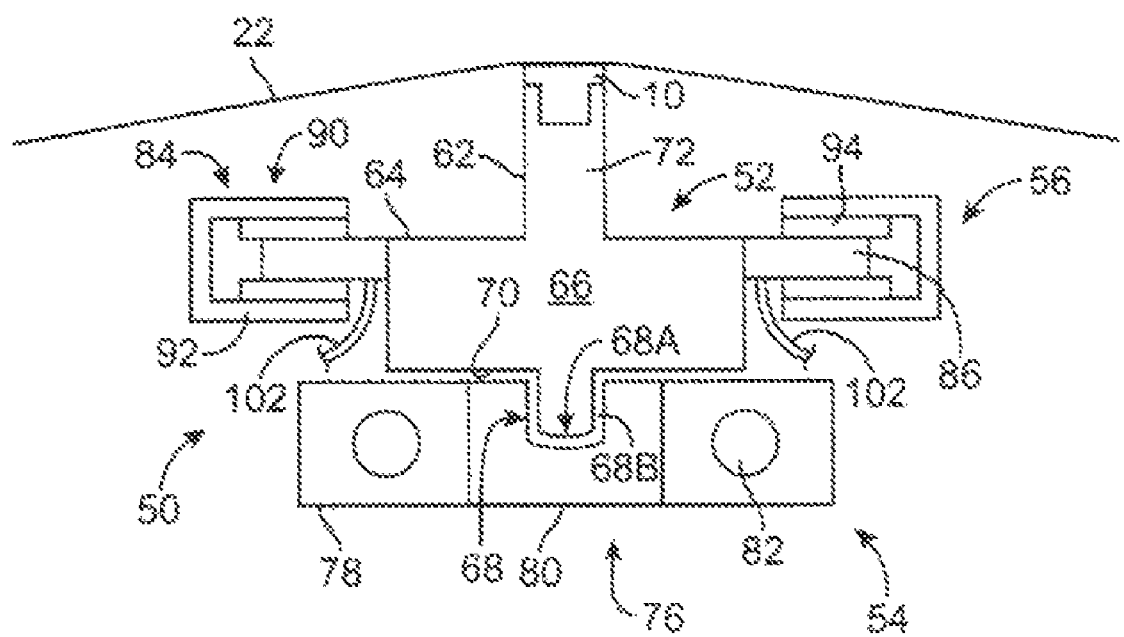
FIG. 3 is a side view of one general embodiment of the system of the invention.
Figure 4:
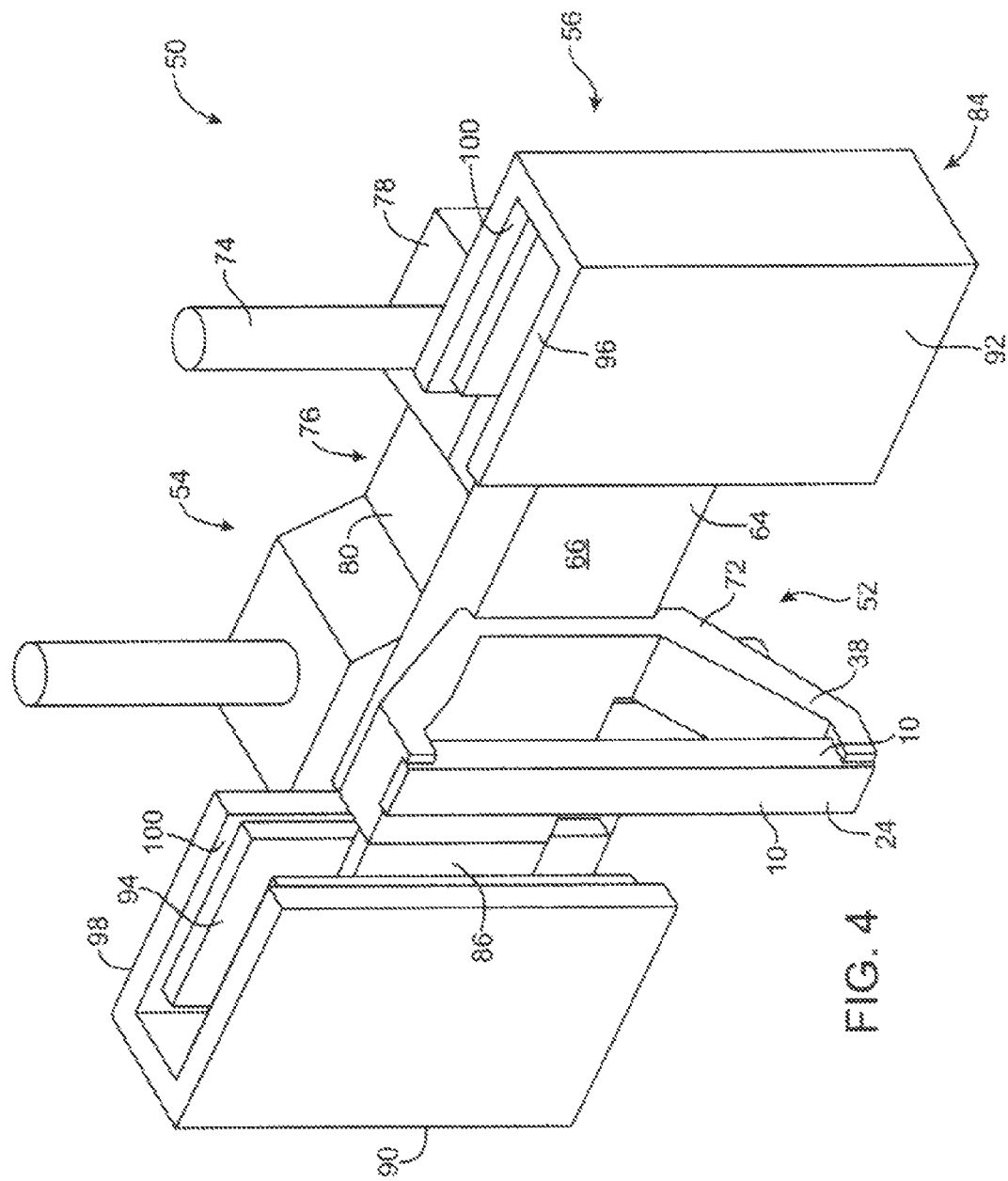
FIG. 4 is a front isometric view of one general embodiment of the system of the invention.
Figure 5:
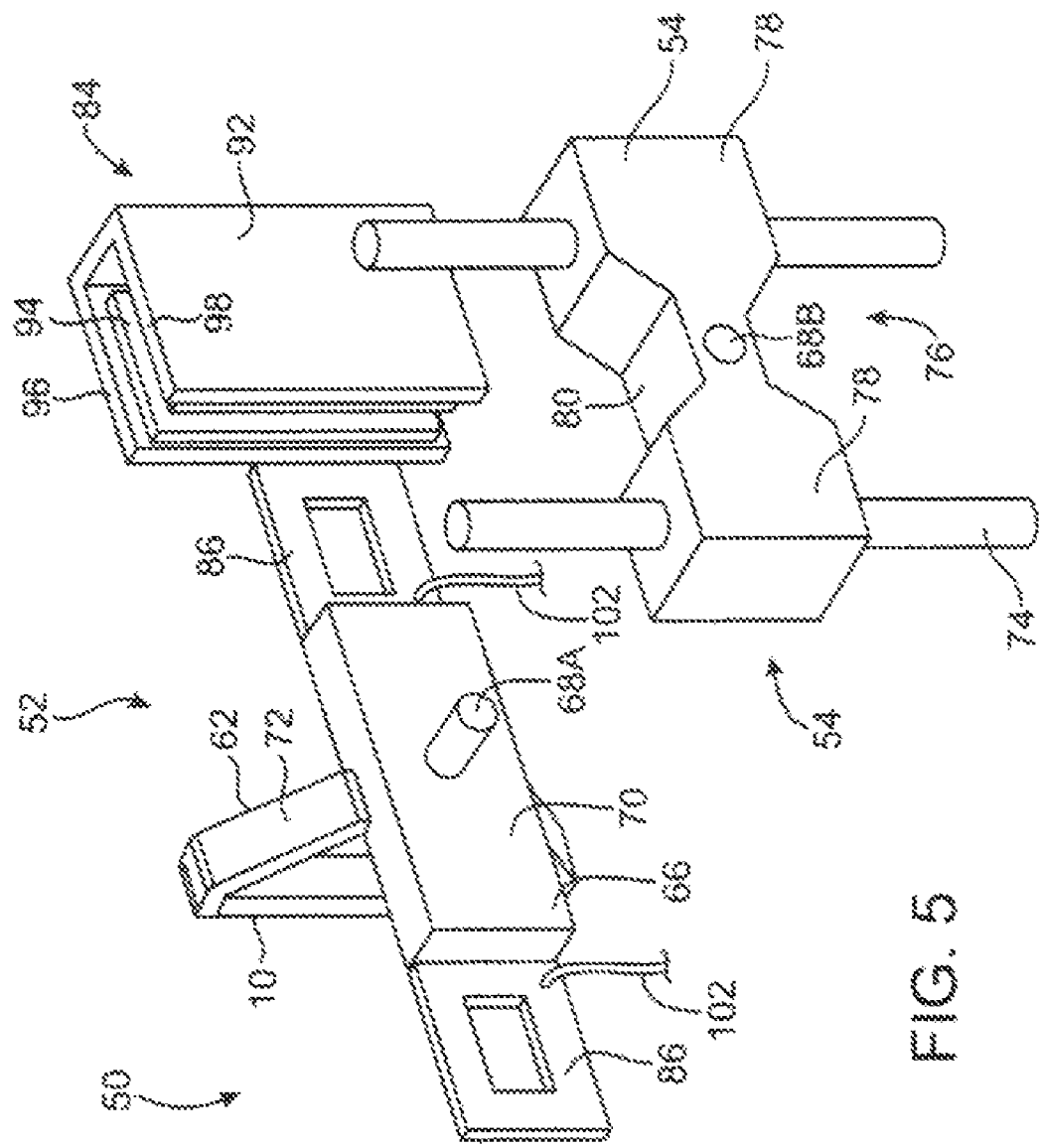
FIG. 5 is a rear exploded isometric view of one general embodiment of the system of the invention.

Referring to FIG. 3 through FIG. 5, there is illustrated an actuator assembly 50 of one general embodiment of the invention. The actuator assembly 50 includes a head carriage assembly 52 pivotably coupled to a linear assembly 54, and a voice coil motor (VCM) assembly 56 for moving the head carriage assembly about the linear assembly 54.

The head carriage assembly 52 is provided to couple to and support a magnetic data read/write head. For example, the head carriage assembly 52 may be configured to support a read/write head, such as the magnetic tape head 10, shown in FIG. 1. It is to be understood that the head carriage assembly 52 may be configured to support any known and/or anticipated read/write heads suitable for reading and writing data from a flexible data storage media, such as magnetic tape 22.

The head carriage assembly 52 may include a head support structure 62 that extends outwardly from a top surface 64 of a base plate 66. At least a portion of a pivot bearing assembly 68 (to be thoroughly discussed hereinafter) may be provided on a bottom surface 70 of the base plate 66 opposite to the support structure 62, for pivotably coupling the head carriage assembly 52 to the linear assembly 54.

The head support structure 62 may be dimensioned to support a read/write head, such as the magnetic tape head 10. In one embodiment, the head, support structure 62 may comprise a pair of arms 72 that extend outwardly from the base plate 66 and couple to each end of the head 10 for supporting the head 10. The arms 72 may be coupled to the head 10 using known methods such as adhesive bonding or fasteners. The arms 72 are dimensioned to support the head 10 in a tape path for reading and writing data to the tape 22.

In one embodiment, the head carriage assembly 52, including the base plate 66, head support structure 62 may comprise a unitary portion. The assembly 52 may fabricated from a single piece, such as by machining, for example. The head carriage assembly 52 may comprise any material suitable for use in data storage devices. In one embodiment, the assembly 52 may comprise injection molded plastic or insert injection molded plastic, or extruded metal or machined from bar stock, for example. The sub-assemblies can be made from smaller pieces or as one whole piece depending on specific design requirements, as is well known in the art.

The linear assembly 54 is coupled to the head carriage assembly 52 via the pivot bearing assembly 68. The linear assembly 54 may comprise any suitable support structure capable of supporting the head carriage assembly 52 and VCM assembly 56, while affording movement of the head carriage assembly 52 transverse to the direction of tape travel D (shown in FIG. 2).

In one embodiment, the linear assembly 54 includes linear supports 74 coupled to a support yoke 76. The linear supports 74 may comprise any suitable support structure that allows the support yoke 70 to travel along the supports 74 to afford movement of the head carriage assembly 52 transverse to the direction of tape travel D.

In one embodiment, the linear supports 74 comprise a pair of rails that extend parallel to one another and are maintained in a fixed position, using known means, that is transverse to the direction of tape travel D. In one embodiment, the rails 74 are generally cylindrical, but may be any suitable configuration, such as rectangular, that will enable the yoke 76 to travel along the rails 74.

In one embodiment, the support yoke 76 may comprise a generally I shaped member that includes two end portions 78 made integral with a center portion 80. An elongated aperture 82 (shown in FIG. 3) is formed in each end portion 78. Each aperture 82 is dimensioned to receive one the rails 74, for slidably coupling the support yoke 76 to the rails 74, thus enabling the yoke 76 to travel along the rails 74.

The center portion 80 may include at least a portion of the pivot bearing assembly 68 in one embodiment. The pivot bearing assembly 68 may comprise any suitable means for pivotably coupling the center portion 80 of the support yoke 76 to the base plate 66 of the head carriage assembly 52, thus coupling the head carriage assembly 52 to the linear assembly 54, while allowing the head carriage assembly 52 to pivot relative to the linear assembly 54.

The pivot bearing assembly 68 may comprise any suitable device or assembly for pivotably coupling the support yoke 76 to the base plate 66, thus coupling the head carriage assembly 52 to the linear assembly 54. In one general embodiment, bearing assemblies and related device assemblies considered to comprise the pivot bearing assembly 68 include: pivot bearing assemblies, such as a known rolling-element bearing, known bushing devices and assemblies, or a flexure spring assembly.

For example, the pivot bearing assembly 68 may comprise a pivot member 68A that is formed on the bottom surface 70 of the base plate 66 and extends downward from the base plate 66. The pivot member 68A may be an integral member of the base plate 66 and may be formed on the base plate 66 using known processes, such as machining, for example. Alternatively, the pivot member 68A may be affixed to the base plate 66 using known methods.

Correspondingly, a pivot receiver 68B may be formed in the center portion 80 of the support yoke 76. The pivot receiver 68B preferably is configured complementary to the pivot member 68A, to receive the pivot member 68A and couple to the member 68A, for pivotably coupling the support yoke 76 to the base plate 66 therewith.

In one general embodiment the voice coil motor (VCM) assembly 56 is coupled to the head carriage assembly 52 for moving the head carriage assembly 52 about the linear assembly 54. The VCM assembly 56 includes a coil and magnet assembly 84 coupled to the head carriage assembly 52.

In one embodiment, a coil 86 is coupled to each end of the base plate 66. The coils 86 may compose any suitable known configuration and are fabricated using known methods and materials. In one typical embodiment, the coils 86 are wound in planar configuration, often referred to in the art as "pancake" configuration. The coils 86 are coupled to each end of the base plate 66 using known methods, such as adhesive bonding or fasteners.

A magnet and magnetic pole assembly 90 is magnetically coupled to each coil 86. The magnet and magnetic pole assembly 90 may comprise any suitable configuration that is complementary to the coils 86, for selectively magnetizing the coils 86. In one typical embodiment, the magnet and magnetic pole assembly 90 comprises a magnet 94 and at least one pole piece 92 that is configured to extend about a coil 86. For example, each pole piece 92 may be substantially U shaped with top and bottom sides 96, 98 that are slightly wider than a corresponding coil 86. A magnet 94 is formed on an inner surface 100 of at least one of the top and bottom sides 96, 98 of the pole piece 92. In a preferred embodiment, a magnet 94 is formed on the inner surface 100 of each of the top and bottom sides 96, 98 of the pole niece 92. The magnets 94 and pole pieces 92 are formed using methods and materials well known in the art. At least one conductive lead, or wire 102, is coupled to each coil 86 for applying electrical current to the coils 86.

Referring to the drawing Figures, data is read from and written to the tape 22, by moving the tape 22 across the head 10 in the direction of tape travel D. During read/write operations, the head is moved in a direction of head movement E that is transverse to the direction of tape travel D, for positioning the reader and writer elements 20 within one of the data bands (Band 0 to Band 3) for reading or storing data. The head 10 is positioned within the desired data band by applying current to the coils 86 of the magnetic pole assembly 90 in synchronous fashion. Applying current to the coils 86 of the head carriage assembly 52 in synchronous fashion moves the head carriage assembly 52 along the linear assembly 54 in a direction of head travel H to position the readers and writers 20 within the data band.

Figure 6:
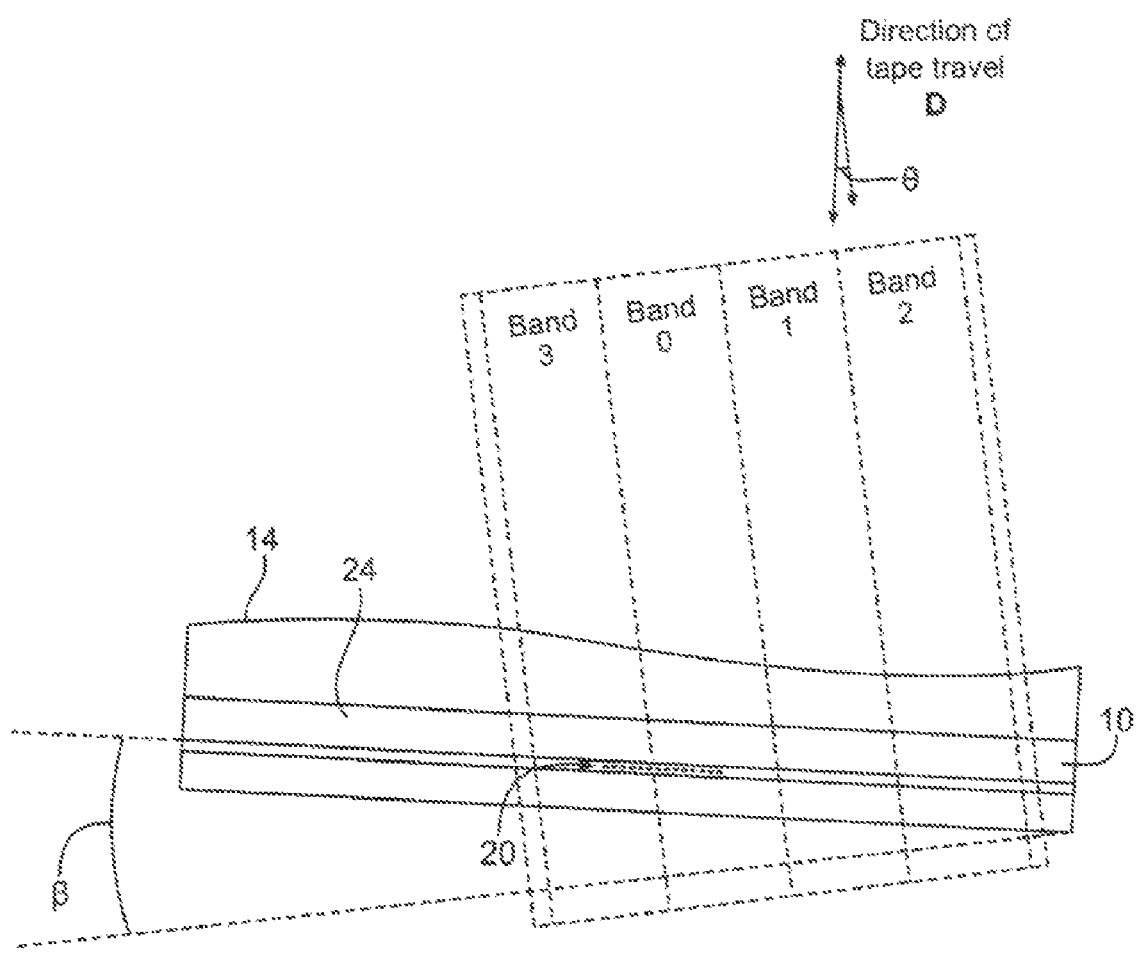
FIG. 6 is a tape bearing surface view showing tape being skewed as it is passing over a tape head of one general embodiment of the system of the present invention.

However, as the tape 22 is moved across the head 10, the tape 22 may skew relative to the direction of tape travel D. As shown in FIG. 6, the tape 22 may skew an arbitrary amount, shown as skew angle θ, relative to the direction of tape travel D. Skew angle θ is shown merely for illustrative purposes only. It is well known in the art that the tape 22 may skew by some arbitrary angle relative to the direction of tape travel D, and in either a clockwise or counterclockwise direction. Skewing of the tape 22 may result in misalignment between the readers and writers 20 of the head 10 and the intended data band where data is to be read or stored.

To compensate for the tape 22 being skewed as it passes over the head 10, current is applied to the coils 86 in bias manner, where more current is applied to one of the coils 86. By applying a greater amount of current to one of the coils 86, the head carriage assembly 52 may be rotated about the direction of head travel H, to obtain a desired arbitrary angle β, relative to the direction of head travel H. For example, a greater amount of current is applied to one of the coils 86 of the VCM assembly 56, for pivoting the head carriage assembly 52 about the linear assembly, via the pivot assembly 68. The head carriage assembly 52 is rotated in either a clockwise or counterclockwise direction to obtain the arbitrary angle β.

In a preferred embodiment, the head carriage assembly 52 is rotated about the direction of head travel H to obtain a desired arbitrary angle β, where arbitrary angle β forms an angle of substantially 90° with skew angle θ, such that the direction head travel H is transverse to the direction of tape travel D, as is preferred, to align the readers and writers 20 of the head 10 with the intended data band for reading and writing data to the data hand.

The length that the head carriage assembly 52 travels along the linear assembly 54 and the rotational distance that the head carriage assembly 52 pivots about the linear assembly 54 can be optimized for a particular tape path. The configuration of the VCM assembly 56 can time to detected skewing of the tape 22, that is he optimized to provide a minimal response significantly less than the systems found in the prior art, such as stepper motor systems. Further, the configuration of the invented actuator assembly 50, including the head carriage assembly 52, linear assembly 54, and VCM assembly 56, provides a system that is significantly less prone to wear as compared to the prior art, such as worm gear and motor systems.

Thus, there has been described a new system for adjusting misalignment between a read/write head and a flexible data storage media. The system includes a head carriage assembly pivotably coupled to a linear assembly, and a magnetic assembly coupled to the head carriage assembly, Current is applied to the magnetic assembly for dynamically positioning the head carriage assembly relative to a direction of media movement across the head carriage assembly. A first current is applied to the magnetic assembly for dynamically positioning the head carriage assembly about an axis substantially transverse to the direction of media movement across the head carriage assembly for track following of flexible media moving across the head carriage assembly. A second current is applied to the magnetic assembly for dynamically rotationally positioning the head carriage assembly about an axis substantially perpendicular to the direction of media movement across the head carriage assembly to compensate for skew of magnetic tape moving across the head carriage assembly in the direction of media movement. The magnetic assembly may comprise a voice coil motor that is coupled to the head carriage assembly for positioning the head, carriage assembly about an axis relative to the direction of media movement across the head carriage assembly.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A system for adjusting misalignment and skew between a read/write head and a flexible data storage media comprising:
   a pivot assembly pivotably supporting a head carriage assembly;
   a voice coil motor coupled to the head carriage assembly for a rotatably positioning said head carriage assembly about an axis of skew which extends perpendicular to the surface of the storage medium, wherein a current applied to the voice coil motor induces a movement of the head carriage assembly about the axis of skew for positioning the head carriage assembly relative to a direction of media movement; and
   a linear assembly supporting the pivot assembly and the head carriage assembly for movement parallel to the media surface and perpendicular to the direction of media movement.

2. The system of claim 1, wherein the voice coil motor comprises: a coil coupled to each end of the head assembly such that there is a first coil and a second coil and a magnetic pole piece coupled to each of the first and second coil.

3. The system of claim 2, wherein the current is applied to the first and second coils in a bias manner such that more current is applied to one of the first or second coils.

4. The system of claim 3, wherein the head carriage assembly is rotatably positioned about the direction of the read/write head travel, H, to obtain an angle, β, relative to the direction of read/write head travel, H, in response to said application of the current.

5. The system of claim 1, wherein the pivot assembly allows dynamic positioning of the head carriage assembly to compensate for skew of media moving across the head carriage assembly in the direction of media movement.

6. The system of claim 1, wherein the pivot assembly allows dynamic positioning of the head carriage assembly for track following of media moving across the head carriage assembly.

7. A head positioning system for adjusting misalignment and skew between a read/write head and a flexible data storage media comprising:
   a head carriage assembly;
   means for pivotably supporting the head carriage assembly;
   means for linearly moving the head carriage assembly parallel to the media surface and perpendicular to the direction of media movement; and
   means for rotatably positioning said head carriage assembly about an axis of skew which extends perpendicular to the surface of the storage medium, wherein a current applied to the rotational positioning means induces a movement of the head carriage assembly about the axis of skew for positioning the head carriage assembly relative to a direction of media movement, wherein the positioning means comprises a voice coil motor including a coil coupled to each end of the head assembly such that there is a first coil and a second coil and a magnetic pole piece coupled to each of the first and second coil.

8. The system of claim 7, wherein the current is applied to the first and second coils in a bias manner such that more current is applied to one of the first or second coils to induce the movement of the head carriage assembly about the axis of skew for positioning the head carriage assembly relative to the direction of media movement.

9. The system of claim 8, wherein the head carriage assembly is rotatably positioned about the direction of the read/write head travel, H, to obtain an angle, $\beta$, relative to the direction of read/write head travel, H, in response to said application of the current.

10. The system of claim 7, wherein the means for linearly moving the head carriage assembly parallel to the media surface and perpendicular to the direction of media movement includes a pair of linear rails allowing positioning of the head carriage assembly substantially transverse to the direction of media movement across the head carriage assembly.

* * * * *